United States Patent Office 3,488,370
Patented Jan. 6, 1970

3,488,370
ORGANIC POLYOXYALKYLENE
ETHER ALUMINATES
Robert E. Leary, Somerville, and Leslie M. Schenck, Mountainside, N.J., assignors to GAF Corporation, New York, N.Y., a corporation of Delaware
No Drawing. Continuation of application Ser. No. 357,815, Apr. 6, 1964. This application Jan. 19, 1968, Ser. No. 699,980
Int. Cl. C07f 5/06; B01j 11/06; C11c 3/00
U.S. Cl. 260—448                                5 Claims

ABSTRACT OF THE DISCLOSURE

Novel organic polyoxyalkylen ether aluminates of the formula

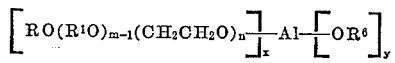

wherein R is a radical containing from 1 to 43 carbon atoms and is selected from the group consisting of alkyl radicals, aryl radicals, alkylaryl radicals, alkylarylmethylene radicals, acyl radicals and any of the above radicals containing from 1 to 5 negative substituents selected from the group consisting of halogen, nitro and cyano, $R^1$ is a divalent residue of a vicinal epoxide containing from 2 to 12 carbon atoms, $R^6$ is an aryl radical, $m$ is an integer of from 1 to 150, $n$ is an integer of from 1 to 3, $y$ is an integer of from 0 to 2 and the sum of $x$ and $y$ is 3, which have valuable surface active properties, particularly in cosmetic formulations and as coating and finishes for textiles, are prepared by the novel method of reacting 1 mole of an aryl aluminate represented by the formula

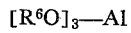

wherein $R^6$ is an aryl radical with from 1 to 3 moles of an organic polyoxyalkylene ether represented by the formula

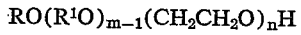

wherein $R^1$, $m$ and $n$ are as defined above.

---

This application is a continuation of application Ser. No. 357,815, filed Apr. 4, 1964, and now abandoned.

This invention relates to an improved method for the production of organic aluminates and to a new and novel class of organic polyoxyalkylene ether aluminates produced by this method.

Organic aluminates of low molecular weight alcohols have been known for over 60 years. The present laboratory method for preparing aluminates of low molecular weight alcohols is by an amalgamation process. Amalgamation is accomplished by placing aluminum turnings in a 2% solution of mercuric chloride. After amalgamation is complete, the metal is washed and dried. The amalgamation aluminum is then placed in an excess of the alcohol used in the esterification and heated to reflux temperature where it dissolves readily. After all of the metal is dissolved, the excess alcohol is distilled off and the organic aluminate is purified by distillation under reduced pressure.

Several commercial processes for preparing aluminates of low molecular alcohols have been based on the above laboratory method. Other types of organic aluminate processes have also been developed. For example, one such process involves dissolving aluminum chloride in the alcohol to be used in the esterification. Ammonia or a low molecular weight primary amine such as methyl amine or the like is then added to form ammonium chloride or an amine hydrogen chloride which is removed by filtration to obtain an alcoholic solution of the desired aluminate. Although all of these processes are useful in the production of aluminates of low molecuar weight alcohols, they are not suitable for production of organic polyoxyalkylene ether aluminates because the organic aluminates cannot be separated from the organic polyoxyalkylene ethers used in the esterification by distillation and byproducts such as ammonium chloride or amine hydrogen chloride cannot be easily removed from the reaction mixture by filtration.

An object of the present invention is to provide an improved method for the preparation of organic aluminates such as organic polyoxyalkylene ether aluminates. Another object is to provide a process for the production of aluminates which does not involve purification of the product by distillation, separation or solvent extraction. A further object is to provide a process which does not employ the use of acid acceptors such as ammonia or amines so that separation and removal of byproducts obtained by reaction of hydrogen chloride with acid acceptors is not required. Another object is to provide a process for the manufacture of organic polyoxyalkylene ether aluminates in high states of purity and in high yields as well as to control the compositions of the aluminates within close limits. Another object is to provide a new and novel class of organic polyoxyalkylene ether aluminates. These and other objects of this invention will become apparent as this description proceeds.

The objects of this invention are attained by our discovery that a new and novel class of organic polyoxyalkylene ether aluminates are produced by reacting organic polyoxyalkylene ethers such as those used as nonionic surfactants (surface active agents) with aryl aluminates such as triphenyl aluminate under anhydrous conditions at reduced pressures and temperatures of from 110° C. to 235° C. as shown in Equation 1

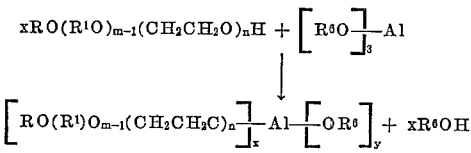

wherein $x$ is an integer of from 1 to 3, $y$ is an integer of from 0 to 2, the sum of $x$ and $y$ is 3, R is a monovalent residue of an organic compound containing at least 1 carbon atom and an active hydrogen atom, $R^1$ is a divalent residue of a vicinal epoxide containing at least 2 carbon atoms, $R^6$ is an aryl radical, $m$ is an integer of at least 1, $n$ is an integer of at least 1 and the sum of $m-1$ and $n$ is at least 1. Generally R is a radical containing from 1 to 43 carbon atoms and selected from the group consisting of alkyl radicals, aryl radicals, alkylaryl radicals, arylmethylene radicals, alkylarylmethyene radicals, acyl radicals and any of the above radicals containing from 1 to 5 negative substituents selected from the group consisting of halogen, nitro and cyano; $R^1$ is a divalent residue of a vicinal epoxide containing from 2 to 12 carbon atoms; $R^6$ is an aryl radical; $m$ is an integer of from 1 to 150; $n$ is an integer of from 1 to 150 and the sum of $m-1$ and $n$ is from 1 to 150.

We have found that when one mole of a polyoxyalkylene ether of an organic compound is used to displace one of the aryl groups in an aryl aluminate in the ester exchange reaction shown Equation 1 under the above described conditions, the displaced aryl radical can be removed from the reaction mixture by vaporization in the form of its hydroxylic derivative as an aryl alcohol such as phenol.

When triphenyl aluminate is used in the ester exchange process, from 1 to 3 moles of an organic polyoxyalkylene ether can be reacted with 1 mole of aryl aluminate and from 1 to 3 of the aryl radicals in the aluminate can be replaced in a stepwise manner. For example, if one mole of any organic polyoxyalkylene ether is reacted with one mole of triphenyl aluminate, one of the phenyl groups in triphenyl aluminate is replaced and a mono organic polyoxyalkylene ether diphenyl aluminate is obtained. The remaining two phenyl groups may then be replaced with organic polyoxyalkylene ether groups by subsequent or continued reaction or reactions.

The method disclosed in the present invention provides a process for the manufacture of high purity organic polyoxyalkylene aluminates and has the advantage that the process may be carried out in simple distillation equipment without the use of solvents, filtration equipment, catalysts or other techniques required by the prior art. This method also provides an economical process for the manufacture of organic polyoxyalkylene ether aluminates which are not readily obtained by the methods known in the prior art.

The process disclosed in this invention may be carried out under anhydrous conditions at temperatures in the range of from 130° C. to 300° C., reduced pressures in the range of from about 0.1 to about 50 mm. and reaction periods of from 0.5 to 10 hours. Usually, reaction temperatures of from about 130° C. to 225° C., reduced pressures of from 4 to 10 mm. and reaction periods of from 3 to 5 hours are employed.

Normally, the process is carried out by reacting from 1 to 3 moles of a polyoxyalkylene ether of an organic compound with 1 mole of triphenyl aluminate under the conditions described above. When desired, the polyoxyalkylene ether may be reacted in a stepwise manner, i.e., 1 mole of the ether may be reacted with the aryl aluminate and the resulting 1 mole of the hydroxylic derivative of the aryl radical removed from the reaction mixture by distillation. An additional mole of the same ether or a dissimilar ether may then be reacted to obtain an aluminate having two ether groups and one aryl group. This process may then be repeated with an additional mole of polyoxyalkylene ether to obtain an aluminate having three ether groups which may be alike or dissimilar depending on the types of organic polyoxyalkylene ethers used.

As examples of polyoxyalkylene ethers of organic compounds which may be used in the preparation of aluminates by the process disclosed in this invention, those known commercially as nonionic surfactants (surface active agents) are preferred. Nonionic surfactants are well known in the art and have many commercial uses. These nonionic surfactants may be represented by Formula I:

(I) $\quad RO(R^1O)_{m-1}(CH_2CH_2O)_nH$ wherein R is either an alkyl radical containing from 1 to 28 carbon atoms, an aryl radical containing from 6 to 14 carbon atoms, an alkylaryl radical containing from 7 to 42 carbon atoms, an arylmethylene (benzyl) radical containing from 7 to 43 carbon atoms, an alkylarylmethylene (alkylbenzyl) radical containing from 8 to 43 carbon atoms, an acyl radical containing from 2 to 30 carbon atoms or any of the above radicals containing from 1 to 5 negative substituents such as halogen, nitro, cyano or the like, $R^1$ is the divalent residue of a vicinal epoxide containing from 2 to 12 carbon atoms, $m$ is an integer of from 1 to 150, $n$ is an integer of from 1 to 150 and the sum of $m-1$ and $n$ is from 1 to 150.

In Formula I, R may be either a straight or branched chain alkyl radical containing from 1 to 28 carbon atoms such as methyl, ethyl, propyl, butyl, amyl, hexyl, octyl, nonyl, decyl, henadecyl, dinonyl, dodecyl, tridecyl, tetradecyl, hexadecyl, heptadecyl, octadecyl, nonadecyl, eicosyl, heneicosyl, docosyl, tricosyl, tetracosyl, pentacosyl, hexacosyl, heptacosyl, myricyl, their isomers, their mixtures or the like. R may also be an aryl radical of from 6 to 14 carbon atoms such as phenyl, diphenyl, naphthyl, 2- and 5-anthryl or the like. Likewise, R may be an alkylaryl radical containing from 7 to 42 carbon atoms such as tolyl (methylphenyl), ethylphenyl, propylphenyl, butylphenyl, diamylphenyl, octylphenyl, nonyl- phenyl, decylphenyl, dodecylphenyl, tridecylphenyl, pentadecylphenyl, octadecylphenyl, dinonylphenyl, dioctadecylphenyl, their isomers, their mixtures or the like. R may also be an arylmethylene (benzyl) radical or an alkylarylmethylene radical containing from 7 to 43 carbon atoms such as benzyl, methylbenzyl, nonylbenzyl, diamylbenzyl, dodecylbenzyl, octadecylbenzyl, dioctadecylbenzyl, their isomers, their mixtures or the like. R may be an acyl radical derived from an organic acid such as acetic, propionic, butyric, isobutyric, acrylic, methacrylic, crotonic, isocrotonic, propiolic, caprylic, pelargonic, capric, n-undecylic, lauric, myristic, palmitic, margaric, stearic, arachidic, behenic, lignoceric, cerotic, melissic, oleic, elaidic, linoleic, α-eleostearic, β-eleostearic, α-linolenic, erucic acid, their isomers or the like. R may also be any of the above types of radical containing from 1 to 5 negative radicals such as chloro, nitro, or the like as substituents.

Suitable methods for preparation of these nonionic surfactants are described in U.S. Patents 1,970,578, 2,213,477, 2,575,832, 2,593,112, and 2,676,975. The complete disclosures and teachings of these patents are incorporated herein by reference. In the preparation of these surfactants, straight or branched chain alkyl alcohols, aryl alcohols, or arylmethyl alcohols, their alkylated derivatives or aliphatic acids may be reacted with the vicinal epoxide either singly or in combination with each other.

Suitable vicinal epoxides for use in preparation of these nonionic surfactants include those compounds which can be represented by Formula II:

(II) 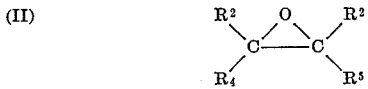

wherein the radicals designated as $R^2$, $R^3$, $R^4$ and $R^5$ individually can be hydrogen and alkyl, alkenyl, haloalkyl, haloalkenyl, aryloxyalkyl, or the like groups, and two of the radicals designated at $R^2$, $R^3$, $R^4$ and $R^5$ may be taken together to form a cycloalkyl group, preferably wherein the radicals $R^2$–$R^5$ have the same values as Thus in Formula I above, the radical $R^1$, which represents the divalent residue of a vicinal epoxide, can be represented by Formula III:

(III) 

wherein the radicals $R^2$–$R^5$ have the same values as stated above for Formula II.

Representative groups of vicinal epoxides which man be employed include, among others, the alkylene oxides, the epoxyalkenes, the aliphatic haloepoxides, the aryloxy-substituted alkylene oxides, the epoxycycloalkanes, and the like which have from 2 to 12 carbon atoms. Specific examples of vicinal epoxides which can be employed include, among others, ethylene oxide, 1,2-epoxypropane, the epoxybutanes, 3,4-epoxy-1-butene, the epoxypentanes, 3,4 - epoxy - 1 - pentene, the epoxyhexanes, the epoxyheptanes, the epoxyoctanes, the epoxynonanes, the epoxydecanes, the epoxydodecanes, 3 - chloro - 1,2-epoxypropane, 3 - chloro - 1,2 - epoxybutane, 1 - chloro - 3,4-epoxy-1-butene, 1 - chloro - 2,3 - epoxybutane, 3,4 - dichloro - 1,2-epoxybutane, 1,4 - dichloro - 2,3 - epoxybutane, 1-chloro-2,3 - epoxypentane, 4-chloro-2,3 -epoxypantane, 3-chloro-1,2 - epoxypentane, 1,4 - dichloro - 2,3 - epoxypentane, 1-chloro - 2,3 - epoxyhexane, the chloroepoxyheptanes, the chloroepoxyheptenes, the chloroepoxyoctanes, the chloroepoxyoctenes, the chloroepoxynonanes, the chloroepoxydecanes, 3-bromo-1,2-epoxypropane, phenyl glycidyl ether, tolyl glycidyl ether, xylyl glycidyl ether and other alkyl-substituted-phenyl glycidyl ethers, epoxycyclohexane and alkyl-substituted epoxycyclohexanes, epoxycyclopentane and alkyl-substituted epoxycyclopentanes, 2,3-epoxybicyclo (2.2.1) heptane, or the like. Preferred vicinal epoxides include alkylene oxides such as ethylene oxide, 1,2-epoxypropane, the epoxybutanes or the like, and saturated aliphatic haloepoxides such as 3-chloro-1,2-epoxypropane, 3-bromo-1,2-epoxypropane, or the like. Thus, in one preferred embodiment of the invention, when an alkylene oxide is employed, Formula III can be represented as —$C_aH_{2a}$— where $a$ has a value of from 2 to 12; and when a saturated aliphatic haloepoxide is employed, Formula III can be represented as —$C_aH_{2a-r}X_r$— wherein $a$ has a value of from 2 to 12, X is a halo group, and $r$ has a value of 1 or 2.

When nonionics are produced by reaction with vicinal epoxides containing more than 2 carbon atoms, these surfactants should be reacted with at least one mole of ethylene oxide per mole of nonionic surfactant before they are employed in the present invention so that the polyoxyalkylene chain is terminated with a hydroxyl attached to the divalent residue of an ethylene oxide molecule. The number of moles of ethylene oxide which may be used in the manufacture of these nonionic surfactants may vary from 1 to 150 moles per mole of hydroxylic compound (Phenol, aliphatic acid or alcohol compound).

As examples of hydroxylic compounds which may be used in the process disclosed by this invention, there may be mentioned those polyoxyalkylated derivatives of phenol and alkylphenols in which the total number of alkyl carbon atoms on the phenolic molecule is from 1 to 36, those derivatives of aliphatic alcohols containing from 6 to 28 carbon atoms as well as those of benzyl alcohol and alkylbenzyl alcohols in which the total number of alkyl carbon atoms is from 1 to 36 and aliphatic acids in which the total number of carbon atoms is from 2 to 22.

As examples of such alkylphenols there may be mentioned cresols, ethylphenols, propylphenols, butylphenols, amlyphenols, hexylphenols, heptylphenols, octylphenols, nonylphenols, decylphenols, docecylphenols, tridecylphenols, octadecylphenols, their mixtures or their isomers. The polyoxyalkylated derivatives of secondary alkylphenols obtained by alkylation of phenols or cresols with α-olefins of the types obtained by the condensation of ethylene in the presence of Ziegler type catalysts or by wax cracking techniques are of particular valve. α-Olefins useful in the preparation of these alkylphenols may contain odd or even numbers of carbon atoms. Mixtures of α-olefins having various ranges of carbon atoms such as $C_6$–$C_7$, $C_7$–$C_9$, $C_9$–$C_{11}$, $C_{11}$–$C_{15}$, $C_{15}$–$C_{20}$ or higher may be used in the preparation of these alkylphenols. Olefins containing even numbers of carbon atoms such as those derived from fats may be employed. Alkylphenols such as m-pentadecylphenols may be used. There may also be used the polyoxyalkylated derivatives of alkylphenols obtained by alkylation of phenol or cresol with dimers, trimers, tetramers, or the like of lower molecular weight olefins such as propylene, butylene, amylene, their isomers or their mixtures. Likewise, di- and tri-substituted alkylphenols obtained by alkylation of the above-mentioned alkylphenols may be used. As examples of such di- and trialkylphenols, there may be mentioned nonylcresol, diamylphenol, didodecylphenol, dinonylcresol, tri-t-butylphenol, trinonylphenol, dioctadecylphenol or the like.

The polyoxyalkylene ether derivatives of alcohols containing from 1 to 28 carbon atoms are another preferred group of nonionic surfactants which may be employed in the present invention. These include the polyoxyalkylene ethers of methyl alcohol, ethyl alcohol, propyl alcohol, butyl alcohol, amyl alcohol, hexyl alcohol, octyl alcohol, decyl alcohol, docecyl alcohol, tridecyl alcoho, hexadecyl alcohol, octadecyl alcohol, docosyl alcohol, heptacosyl alcohol, myricyl alcohol, their isomers, their mixtures or the like. Secondary alcohols such as 2-octanol, 2-decanol, 2-tetradecanol and 2-hexadecanol are particularly useful. Alcohols useful in the preparation of these ethers may be produced by a variety of methods. For example, they may be prepared by the hydrogenation of fatty acids or glycerides. They may be prepared by the oxo process. They may also be prepared by the Ziegler process as described in Kirk-Othmer, "Encyclopedia of Chemical Technology," vol. 1, p. 540 (John Wiley & Sons, New York., N.Y., 2 ed., 1963).

Benzyl alcohol and alkylbenzyl alcohols in which the total number of alkyl carbon atoms is from 1 to 36 may also be used in the preparation of nonionic surfactants useful in this invention . Specific examples of benzyl alcohols which may be employed include among others, benzyl alcohol, p-methylbenzyl alcohol, o-ethylbenzyl alcohol, propylbenzyl alcohol, i-propylbenzyl alcohol, t-butylbenzyl alcohol, s-pentylbenzyl alcohol, n-hexylbenzyl alcohol, octylbenzyl alcohol, nonylbenzyl alcohol, dodecylbenzyl alcohol, tridecylbenzyl alcohol, octadecylbenzyl alcohol, their isomers, their mixtures or the like.

The polyoxyalkylene ether derivatives of organic acids in which the total number of carbon atoms is from 2 to 30 are another group of nonionic surfactants which may be employed in the present invention. This group includes the polyoxyalkylene ethers of acetic acid, propionic acid, butyric acid, isobutyric acid, acrylic acid, methacrylic acid, crotonic acid, isocrotonic acid, propiolic acid, caprylic acid, pelargonic acid, capric acid, n-undecylic acid, lauric acid, myristic acid, palmitic acid, margaric acid, stearic acid, arachidic acid, behenic acid, lignoceric acid, ceratic acid, melissic acid, oleic acid, elaidic acid, linoleic acid, α-eleostearic acid, β-eleostearic acid, α-linolenic acid, erucic acid, their isomers or the like.

Polyoxyalkylene ethers of any of the above described types of radicals containing from 1 to 5 negative radicals as substituents may also be used in the present invention. Such groups include the polyoxyalkylene ethers of monochlorophenol, dichlorophenol, pentachlorophenol, mononitrophenol, propylene cyanhydrin, or the like.

The following examples of nonionic surfactants may be employed as intermediates in the manufacture of aluminates by the process disclosed by this invention. In these examples, E.O. represents ethylene oxide, Pr. O. propylene oxide, Bu. O. butylene oxide, Oc. O. octylene oxide, St. O. styrene oxide, Dd. O. dodecylene oxide, ClPr. O. chloropropylene oxide (3-chloro-1,2-epoxy propane) and the number immediately preceding each of these formulas refers to the number of moles of the oxide thereof reacted with one mole of the reactive hydrogen containing organic compound. Such nonionic surfactants include phenol+1 E.O., phenol+5 Bu. O.+1 E.O., o-cresol+1 Pr. O.+2 E.O., diisobutylphenol+9 E.O., nonylphenol+6 E.O., diamylphenol+8 E.O., dodecylphenol+2 E.O., diamylphenol+1 St. O.+10 E.O., hexylphenol+4 E.O., octadecylphenol+20 E.O., dioctadecylphenol+150 E.O., lauryl alcohol+4 E.O., isooctyl alcohol (oxo alcohols)+5 E.O., decyl alcohol (oxo alcohols)+50 Pr. O.+100 E.O., tridecyl alcohol (oxo alcohols)+50 E.O., tallow alcohol+30 E.O., stearyl alcohol+70 E.O., t-butylphenol+1 Oc. O.+18 E.O., phenol+1 Dd. O.+12 E.O., n-hexyl alcohol+1 St. O.+11 E.O., lauryl alcohol (Ziegler process)+15 Pr. O.+20 E.O., oleyl alcohol+40 E.O., m-pentadecyl phenol+90 E.O., t - butylphenol+2 ClPr. O.+10 E.O., methyl alcohol+1 E.O., acetic acid+1 E.O., p-chlorophenol+20 E.O., oleic acid+150 E.O., or the like.

It is to be understood that in some applications use of nonionics derived from mixtures of alkylphenols or alcohols may be beneficial. Such mixtures include alkylation mixtures containing alkylphenols and unreacted olefins, alkylphenol mixtures which have been stripped to remove unreacted olefins, residues of alkylation mixtures containing high boiling alkylphenols, crude alcohol mixtures, alcohol mixtures containing dissimilar alcohols, mixtures of alcohols and phenols or the like. Advantages of these compositions as hydrophobes for nonionics are well known to those skilled in the art. Frequently, such mixtures have unique and improved surfactant properties. As further examples of compositions which may be used to prepare polyalkoxylated derivatives, there may be mentioned mixtures of nonylphenol, still bottoms from dodecylphenol alkylations, crude alcohol mixtures obtained from hydrogenation of natural products such as vegetable or animal oils or alcohol mixtures obtained from the commercial synthetic alcohol processes.

Aryl aluminates and substituted aryl aluminates which may be used as intermediates in the practice of this invention include those compounds which are represented by Formula IV (IV) $[R^6O]_3$—Al wherein $R^6$ is an aryl radical. Representative aluminates include triphenyl aluminate, tri (o-cresyl) aluminate, tri (m-cresyl) aluminate, tri (p-cresyl) aluminate, tri (2,4-xylenyl) aluminate, tri (2,4-dichlorophenyl) aluminate, tri (hexylphenyl) aluminate, tri (nonylphenyl) aluminate, tri (dinonylphenyl) aluminate, tri (dodecylphenyl) aluminate, tri (2-naphthyl) aluminate, their isomers, their mixtures or the like. It will be understood that it is preferred to use triaryl aluminates in which the group $R^6O$ represents the residue of a readily distillable phenolic compound usually phenol or alkylphenols having 1 to 18 alkyl carbon atoms.

Organic polyoxyalkylene ethers of aluminates which may be produced by the process disclosed in this invention include those aluminates which are represented by Formula V (V) 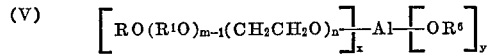

wherein R, $R^1$, $R^6$, m and n have the values assigned above and x is an integer of from 1 to 3, y is an integer of from 0 to 2 and the sum of x and y is 3.

The following examples illustrate preferred embodiments of the process disclosed by this invention. These examples are illustrative of the present invention but are not to be regarded as limitative. It will be understood that all parts, percentages and proportions referred to herein and in the appended claims are by weight unless otherwise indicated.

EXAMPLE 1

Into a 1-liter 3-neck flask equipped with a thermometer, agitator and having a distillation head with thermometer which is attached to a condenser and receiver are charged 153 g. (0.5 mole) of triphenyl aluminate and 537 g. (1.5 mole) of stearyl alcohol+2 E.O., a nonionic surfactant. The mixture is heated to 225° C. (degrees centigrade) over a period of 2 hours under a reduced pressure of 1 mm. of Hg. This reaction mixture is held at 225° C. and 1 mm. pressure for an additional hour. A total of 140 grams of phenol is distilled from the reaction mixture which indicates complete replacement of the three phenyl groups in triphenyl aluminate. The product remaining in the flask is a pale gray residue which solidifies on cooling. Analysis shows that the product contains no phenol or triphenyl aluminate and has an aluminum content of 2.39%. The product is found to have the formula:

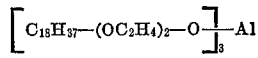

EXAMPLE 2

Operating as in Example 1, 102 g. (0.33 mole) of triphenyl aluminate and 612 g. (1.0 mole) of nonylphenol+9 E.O., a nonionic surfactant, are reacted to obtain a compound having the formula and containing 1.40% of aluminum by analysis.

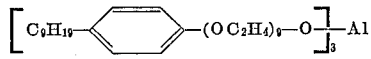

The product has a surface tension at 0.1% and 25° C. of 30.2 dynes/cm. as compared to nonylphenol+9 E.O. which has a surface tension of 31.0 dynes/cm. It has a Draves wetting at 0.1% and 25° C. of 11 seconds as compared to 9 seconds for nonylphenol+9 E.O. The product has Ross-Miles foam values at 0.1% and 50° C. of 29 mm. at 0 min. and 23 mm. after 5 min. as compared to 60 mm. and 10 mm. for nonylphenol+9 E.O.

EXAMPLE 3

Operating in a manner similar to the procedure given in Example 1, 171 g. (0.5 mole) of dodecylphenol+1.8 E.O. is reacted with 50.2 g. (0.164 mole) of triphenyl aluminate to obtain a product containing 2.4% aluminum by analysis and having the formula:

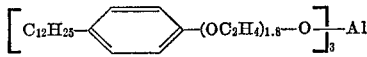

EXAMPLE 4

The procedure in Example 1 is repeated using 314 g. (1.0 mole) of octadecylalcohol monoethoxylate and 102 g. (0.33 mole) of triphenyl aluminate. A product having the formula and containing 2.5% aluminium is obtained:

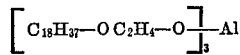

EXAMPLE 5

The procedure of Example 1 is repeated using 348 g. (0.6 mole) of dioctyphenol+3 Pr.O.+2 E.O. and 61.2 g. (0.2 mole) of triphenyl aluminate. A product having the formula is obtained:

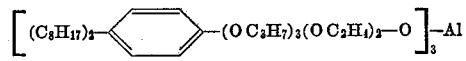

EXAMPLE 6

Operating in a manner similar to the procedure given in Example 1, 828 g. (0.6 mole) of acetic acid+30 E.O., a nonionic surfactant is reacted with 61.2 g. (0.2 mole) of triphenyl aluminate to obtain a product having the formula:

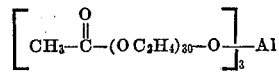

EXAMPLE 7

Example 1 is repeated except that 102 g. (0.33 mole) of triphenyl aluminate is reacted with 663.2 g. (0.1 mole) of methyl alcohol +150 E.O. to obtain a product having the formula:

$CH_3$—$(OC_2H_4)_{150}$—$OAl(OC_6H_5)_2$

EXAMPLE 8

Operating in the manner described in Example 1, 684 g. (0.1 mole) of the product obtained in Example 7 and 20.7 g. (0.1 mole) of 2,4-dichlorophenoxyethanol are reacted to obtain a compound having the formula:

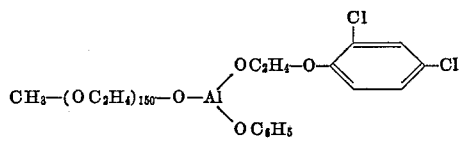

Organic polyoxyalkylene aluminates produced by the process disclosed in this invention have many advantages over the aluminates of lower molecular weight alcohols now being offered commercially. The products of this invention have relatively high molecular weights so their hydrolysis is retarded, whereas the aluminates of low molecular weight alcohols are difficult to prepare or hydrolyze too rapidly to be useful in systems where water is present such as emulsifiers in cosmetic formulations, as anti-perspirants or the like. Polyoxyalkylene aluminates are particularly suitable for use in cosmetic formulations because aluminum not only imparts its own desirable properties, but also reduces the tendency of organic polyoxyalkylene ethers to cause skin irritation. Polyoxyalkylene ether groups also impart desirable properties such as improved water solubility improved compatibility in water-oil systems or the like to aluminates which cannot be obtained when the low molecular weight alcohol groups are used as substituents.

Polyoxyalkylene aluminates may also be used as coatings and finishes for textiles and as reducing agents for ketones particularly hydrophobic ketones. They may also be used as crosslinking agents and as intermediates in the synthesis of more complex aluminum alkoxides. They may be used as water repellents and gelling agents in gelled gasolines. They are also useful as catalysts in combination with chlorides, such as zinc chloride in the polymerization of ethylene oxide.

This invention has been disclosed with respect to certain preferred embodiments. Various modifications and variations thereof will become obvious to persons skilled in the art. It will be understood that such modifications and variations are to be included within the spirit and the scope of this invention.

We claim:

1. An organic polyoxyalkylene ether aluminate that is represented by the formula:

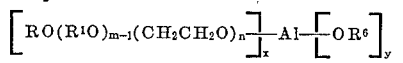

wherein R is a radical containing from 1 to 43 carbon atoms and is selected from the group consisting of alkyl radicals, aryl radicals, alkylaryl radicals, alkylarylmethylene radicals, acyl radicals and chloro-phenyl radicals containing 1 to 2 chlorine substituents, $R^1$ is a divalent residue of a vicinal epoxide containing from 2 to 12 carbon atoms, $R^6$ is an aryl radical, $m$ is an integer of from 1 to 150, $n$ is an integer of from 1 to 150, the sum of $m-1$ and $n$ is from 1 to 150, $x$ is an integer of from 1 to 3, $y$ is an integer of from 0 to 2 and the sum of $x$ and $y$ is 3.

2. An organic polyoxyalkylene ether aluminate of the formula:

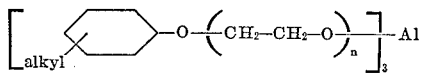

wherein alkyl represents an alkyl group of from 1 to 28 carbon atoms and $n$ is an integer of from 1 to 150.

3. An organic polyoxyalkylene ether aluminate, as defined in claim 2, wherein the alkyl group specified is a nonyl group.

4. An organic polyoxyalkylene ether aluminate as defined in claim 2, wherein the alkyl group specified is a dodecyl group.

5. An organic polyoxyalkylene aluminate having the formula:

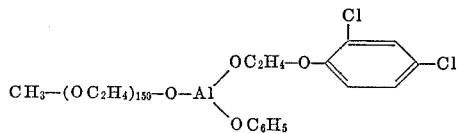

References Cited

UNITED STATES PATENTS

| | | | |
|---|---|---|---|
| 3,214,451 | 10/1965 | Michaels | 260—448 |
| 3,255,256 | 7/1966 | Miller | 260—448 |
| 3,294,848 | 12/1966 | Earing | 260—448 |
| 3,021,372 | 2/1962 | Dupre et al. | |
| 3,036,130 | 5/1962 | Jackson et al. | |
| 3,118,000 | 1/1964 | Dupre et al. | |
| 3,214,451 | 10/1965 | Michaels. | |
| 3,238,237 | 3/1966 | Bedoit. | |
| 3,285,816 | 11/1966 | Kaplan. | |
| 3,294,848 | 12/1966 | Earing et al. | |
| 3,321,533 | 5/1967 | Patton et al. | |

FOREIGN PATENTS 767,601   2/1957   Great Britain.

TOBIAS E. LEVOW, Primary Examiner

H. M. S. SNEED, Assistant Examiner

U.S. Cl. X.R.

44—7; 117—138.5; 252—8.9, 431; 260—999, 2, 410.6